(12) United States Patent
Dean et al.

(10) Patent No.: US 8,976,436 B2
(45) Date of Patent: Mar. 10, 2015

(54) CONTROLLED DIFFUSE SCATTERING FOR DISPLAYS

(71) Applicants: Kenneth A. Dean, Phoenix, AZ (US); John Rudolph, Cincinnati, OH (US); Shu Yang, Cincinnati, OH (US)

(72) Inventors: Kenneth A. Dean, Phoenix, AZ (US); John Rudolph, Cincinnati, OH (US); Shu Yang, Cincinnati, OH (US)

( * ) Notice: Subject to any disclaimer, the term of this patent is extended or adjusted under 35 U.S.C. 154(b) by 0 days.

(21) Appl. No.: 13/745,532

(22) Filed: Jan. 18, 2013

(65) Prior Publication Data
US 2013/0335805 A1    Dec. 19, 2013

Related U.S. Application Data

(60) Provisional application No. 61/632,248, filed on Jan. 19, 2012.

(51) Int. Cl.
| | |
|---|---|
| G02B 26/02 | (2006.01) |
| G02F 1/07 | (2006.01) |
| G02B 26/00 | (2006.01) |
| G02B 26/08 | (2006.01) |

(52) U.S. Cl.
CPC ............ *G02B 26/005* (2013.01); *G02B 26/004* (2013.01); *G02F 1/07* (2013.01); *G02B 26/0841* (2013.01)
USPC ........... 359/253; 359/228; 359/245; 359/290; 345/107

(58) Field of Classification Search
CPC ............................ G02B 26/004; G02B 26/005
USPC ......... 359/228, 245, 253, 254, 290–292, 296; 345/55, 60, 84, 107; 445/24; 204/450, 204/518
See application file for complete search history.

(56) References Cited

U.S. PATENT DOCUMENTS

| | | | | |
|---|---|---|---|---|
| 4,442,019 | A * | 4/1984 | Marks ........................... | 252/583 |
| 2003/0223121 | A1* | 12/2003 | Otake et al. ................... | 359/619 |
| 2010/0208328 | A1* | 8/2010 | Heikenfeld et al. .......... | 359/290 |
| 2012/0081777 | A1* | 4/2012 | Heikenfeld et al. .......... | 359/290 |
| 2012/0092748 | A1* | 4/2012 | Ostergaard et al. ........... | 359/290 |
| 2013/0033476 | A1* | 2/2013 | Dean et al. .................... | 345/211 |
| 2013/0128336 | A1* | 5/2013 | Dean et al. .................... | 359/290 |

OTHER PUBLICATIONS

S. Yang et al. "High reflectivity electrofluidic pixels with zero-power grayscale operation," AIP Publishing, Oct. 4, 2010, Appl. Phys. Lett. 97, 143501-1 to 143501-3.*

* cited by examiner

*Primary Examiner* — Thomas K Pham
*Assistant Examiner* — Marin Pichler
(74) *Attorney, Agent, or Firm* — Wood, Herron & Evans, LLP

(57) ABSTRACT

A display device comprising a pixel, where the pixel includes: (a) a polar fluid that is at least one of colored and black, (b) a non-polar fluid that is at least one of transparent and translucent, (c) a first substrate, (d) a second substrate arranged relative to the first substrate to define a channel occupied by the polar fluid and the non-polar fluid, wherein at least one of the polar fluid and the non-polar fluid is visible, (e) a reflector having a plurality of features, comprising at least one of concavities and projections, that alter an angle of reflected light from a specular reflection to provide the appearance of a diffuse reflection, the display device also including a plurality of electrodes configured to cause repositioning of the polar fluid in the channel to displace at least a first portion of the non-polar fluid and a voltage source.

20 Claims, 8 Drawing Sheets

PRIOR ART

CONTROLLED DIFFUSE SCATTERING FOR DISPLAYS

CROSS REFERENCE TO RELATED APPLICATIONS

The present application claims the benefit of U.S. Provisional Patent Application Ser. No. 61/632,248, filed on Jan. 19, 2012 and titled, "CONTROLLED DIFFUSE SCATTERING FOR DISPLAYS," the disclosure of which is hereby incorporated by reference.

RELATED ART

1. Field of the Invention

The present disclosure relates to electrofluidic devices that provide an optical response for the purpose of altering surface reflectivity, transmission through a surface, or creating 2D or 3D images for informational display.

2. Brief Discussion of Related Art

Consumers are used to reading printed media formed from ink printed on paper. The brightness, whiteness, and contrast of ink on paper provides a reading experience that meets a consumers needs both indoors and outdoors. Emissive displays such as LCDs that are using in computers, tablets, phones, and digital cameras are more difficult to read, causing eye strain, and are simply unreadable in direct sunlight or bright indirect sunlight. Moreover, emissive displays consume great amounts of power to provide a similar viewing experience to printed media, both limiting the battery life and also increasing the weight of portable electronic devices. Reflective displays consume less than $1/10^{th}$ the power of emissive displays and are readable outdoors, so they should provide an improved solution. Indeed for some applications, reflective displays like eInk electrophoric displays, used ubiquitously in monochrome ebooks, have proven commercially successful.

However reflective displays fall short of the levels of brightness, color and contrast of printed media, and this has limited their market impact, in both monochrome and color applications. Displays inherently have limitations. Display films, electro-optical physics, and index mismatches limit the amount of reflected light that can be obtained. E-ink films, for example, provide less than 40% white reflectance. Liquid crystal displays typically provide even less white reflectance. In contrast, the reflectance of paper exceeds 60% for newspaper and 76% for magazines (and often 80%), and this reflectance is inherently lambertian. Consequently, monochrome eReaders based on electrophoretic displays (also lambertian) do not have the brightness and contrast of newspaper.

More importantly, commercially—viable display technologies produce full-color content through laterally distributed color pixels. Example are the RGB and RGBW color filter pixel arrangements of emissive liquid crystal displays. For reflective displays, the lateral arrangement of colors cuts the overall brightness to ⅓ or ¼ that of monochrome surface, and in the case of related art reflective displays, to less than ⅙ to ⅛ that of paper. Consequently, lateral color arrangements on reflective displays have not been widely commercially successful. Examples include Jetbook's RGBW electrophoretic eReader and Kyobo's RGB Mirasol eReader. Reflective color displays need more brightness if they are to compete with the vivid colors found in transmissive LCDs or reflective newspaper. Also, if the contrast is not high, white bleeds into the other colors causing poor color saturation (pastel or wash-out). Given the large brightness deficit incurred by the color filter method, consumers may prefer to sacrifice a truly lambertian brightness distribution for more saturated colors. Consequently, there is a need for monochrome and color displays with improved diffuse scattering properties for maximizing brightness and contrast.

The best reflector materials, aluminum and silver, reflect 90 to 96% of incident light. This should provide good surface brightness, but the problem is that this reflection is specular (the opposite of lambertian), meaning all the light is reflected back in one direction. A surface covered with metal looks 'silver' or 'grey' and not white. Viewers can often see their reflections in high quality metalized surfaces. For a surface to appear 'white' it must have significant angular distribution of reflection. A rough metallized surface scatters light in a number of directions due to the roughness of the surface. By changing the nature of the rough surface, a metallized surface can exhibit a broadened reflective distribution. In fact, because the light is still preferentially reflected in one direction, although with a broadened distribution, more light is obtained in this direction than from a lambertian surface, resulting in optical gain, the ratio of light reflected from a surface compared to a lambertian surface, when the ratio is greater than 1. In effect, these gain surfaces reflect more light towards the light source than at low angles relative to the surface. They trade off viewing angle for more intense light normal to the surface. In addition, consumers tend to automatically adjust the orientation of their portable displays by 15 degrees or more to maximize contrast without thinking about it, providing an avenue for maximizing optical gain.

In the 1990s, several companies developed liquid crystal displays incorporating a lumpy metallized back-reflector surface for the purpose of enhancing the optical performance of reflective color liquid crystal displays through optical gain. Liquid crystal displays intrinsically have limited viewing angles, so some restriction of the viewing angle was tolerated. Sharp shipped displays with this technology, and additional references are herein included: (A) U.S. Pat. No. 7,543,950 "Diffuse reflector for a liquid crystal display device", (B) Y. Ishii and M. Hijikigawa, "Development of Highly Reflective Color TFT-LCDs", Asia Display 98 Digest, 119 (1998), and (C) C. J. Wen, D. L. Ting, C. Y. Chen, L. S. Chuang, and C. C. Chang, "Optical Properties of Reflective LCD with Diffuse Micro Slant Reflectors (DMSR), Society for Information Displays Digest 10, 526 (2000). An example product was a color Blackberry phone. The colors lack saturation and appear pastel in these displays because the intrinsic brightness of the liquid crystal display is too low to make up for RGB lateral colors. Sharp's solution was also 'silvery' in the 'white' state, as it sought to maximize gain with significant specular contributions. To achieve adequate brightness, the color filters are not fully colored, each transmitting more white than is required for a truly saturated primary color.

Samsung/Liquavista has sought to improve the optical performance of electrowetting displays using a textured back reflector. Melanie van de Weijer, Andrea Giraldo, Anthony Slack, "High Performance, High Reliability Electrowetting Displays for ePaper Applications," International Display Works (IDW) 2011 Conference Proceedings, 399 (2011). But Samsung encountered a problem when attempting to integrate this light diffuser. Texturing of the fluoropolymer-coated back surface caused the low surface energy non-polar fluid of Samsung's display to become trapped in the topography. Yet in Samsung's electrowetting displays the nonpolar fluid is colored (the opposite of the instant exemplary embodiments), which caused Samsung to experience color-sticking errors when the nonpolar colored fluid became trapped. Consequently, the magnitude of the topography in Samsung's displays has been limited, and Samsung's displays exhibit a specular 'silvery' character. Samsung has provided a haze filter on the front surface of its displays in an attempt to reduce the specular component, but this unfortunately results in reduced contrast because the haze filter washes out the black character.

What is desired, yet unmet by the prior art and later developed technologies of third parties, is a reflective display with the brightness, contrast, and color performance equal to or closely approaching printed media. In the application space of 'portable' displays, the instant disclosure provides a portable display having relatively low power consumption and sunlight-readability without compromising color performance. In the signage application space, the instant disclosure provides a signage having an electrically-changeable display with the performance equal to or closely approaching printed media. Specifically, the instant disclosure provides a display technology solution utilizing optical gain to enable displays having brightness and color equal to or closely approaching printed media.

INTRODUCTION TO THE INVENTION

The present invention is directed to a device, a specifically-textured reflective surface in combination with a high efficiency electrofluidic light valve, to achieve brightness and color performance of printed ink-on-paper media.

The instant disclosure includes using a textured reflective surface with an electrofluidic display comprising a plurality of electrofluidic pixels. The textured reflective surface may be fabricated by embossing, laminating, vacuum forming, stamping, molding, and imprinting. The example embossed materials photoresists such as SU8 or PerMX, and plastics such as PET, PEN, polyimide, polycarbonate, acrylic, polyethylene, and other typical formed plastics as well as glass. The invention also includes forming the features via photolithography processes (as have been published).

Additional enhancements provide even better diffuse performance for an exemplary visual display. The lower-angle reflected rays undergo internal reflection at the top glass to air interface, thereby undergoing internal reflection. Antireflective films may be utilized on at least the top glass of the display to realize good angular performance.

Applications like electronic shelf labels may not need to be lambertian in the y-direction because signs may be at head level. Asymmetric surface texturing may be used to redirect this light towards the more common viewing angles leading to higher efficiency.

Other techniques such as diffraction may be used to re-direct light in place or along with the textured aluminum.

Transparent and translucent electrofluidic displays in accordance with the instant disclosure may include lambertian or gain backing films. Transparent and translucent electrofluidic displays of this sort take advantage of the highly transparent property of an electrofluidic display (on the order of 75% to 90% transparent). Exemplary electrofluidic displays comprise a plurality of electrofluidic cells that each may be fabricated using transparent materials (e.g., transparent conductors such as, without limitation, index-matching indium tin oxide, Cambrios ClearOhm, etc.) on both the top substrate/plate and the bottom substrate/plate. These translucent or transparent materials may then be operatively coupled to a reflective backing material that includes, without limitation, a textured metallic surface that provides optical gain, and a highly reflective white film such as Kimoto's 96% reflective white polyethylene terephthalate (PET) polymer or a gain diffuser. The resulting electrofluidic cells may provide a white state that is greater than 50% reflective (Lightness, $L^* > 76$, as corrected for non-linear human visual perception) and the black state that is less than 1% reflective, which results in a good contrast ratio and a lambertian reflectance distribution.

In further exemplary embodiments, the reflective backing material is positioned a minimal straight line distance (e.g., as close as is possible) to the cavity containing the electrofluidic ink. Placement of the reflective backing material in close proximity to the cavity containing the electrofluidic ink reduces the light from being absorbed twice by the ink. In the most preferred embodiments, the a textured metallic reflector is the channel electrode and lies adjacent to the ink, or a white film (e.g., titania-loaded photoresist, white polymer, or stamped white ink), may be positioned directly underneath an ink or polar fluid electrode. or In a circumstance where a white PET film is used as at least part of the reflective backing material, the white film may be about 1 mm behind the plane of the colorant to provide an effective diffuser, but not necessarily an optimal diffuser. Using a gain reflector provides an advantage over vertical electrophoretic technologies such as e-ink. In comparison to e-ink, which is inherently lambertian, the colors will be at least three times brighter, nearly making up for the presence of the color filters.

Next, a pixel, having high white state reflectance, typically operating by moving a colored material into and out of the optical path, is required to achieve commercially meaningful levels of reflectivity and contrast. Electrofluidic, Electrowetting, and lateral electrophoretic pixels are examples of technologies all capable of presenting an optical path with at least 50% overall reflectivity.

In addition, the single user configuration of these devices, coupled with the fact that most lighting situations contain one most-significant light source, enables the use of an asymmetric diffuse textured reflective surface to shift the peak of the diffuse reflection about 15 degrees off the specular reflection from the top surface, resulting in additional improved contrast.

A key performance parameter which cannot be easily calculated is whether the diffuse reflector surface looks white or silver-ish. In fact, from the literature, it is unclear that any diffuse metallic reflector can look white. By fabricating a number of surfaces, we developed an empirical understanding of the property. Diffuse reflectors with a randomized design can, in fact, produce a truly white diffuse surface. (Patterns with periodicity produce specular speckle.) Moreover, the white color dominates even for surfaces with optical gain up to about 3× in the viewing direction. We observed that very small nodules on the undulating surface are effective in reducing any residual specular sparkle while reducing the overall reflectance by only ~10%. Another point is that white, diffuse reflectance can be obtained without the use of haze filters, which have deleterious effects on the black state and color saturation.

The combination of high aperture ratio pixel technology and a properly textured metallic surface that looks white can produce a display with white reflectivity exceeding 50%, black reflectivity below 4% and a lambertain-like reflectivity over >100° of viewing angle. Anti-reflective coatings can be used to further increase the viewing angle by letting light at higher angles escape the display.

DETAILED DESCRIPTION

The exemplary embodiments of the present disclosure are described and illustrated below to encompass a device, a specifically-textured reflective surface in combination with a high efficiency electrofluidic light valve, to achieve brightness and color performance of printed ink-on-paper media. Of course, it will be apparent to those of ordinary skill in the art that the embodiments discussed below are exemplary in nature and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present disclosure.

Figure 1A:
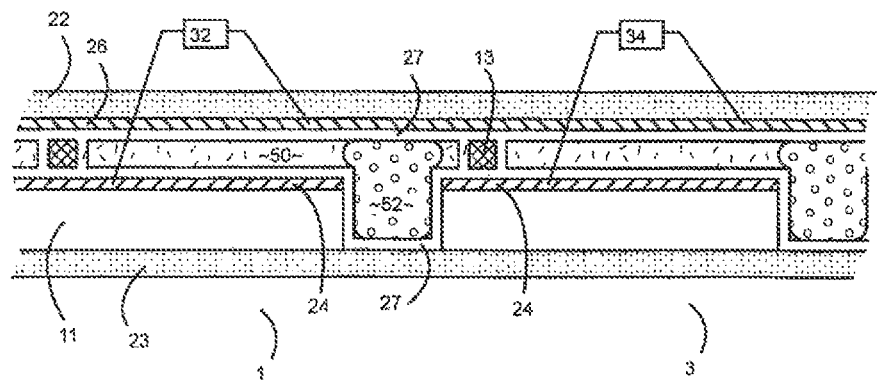
FIG. 1A is a side view of a prior art display element.
Figure 1B:
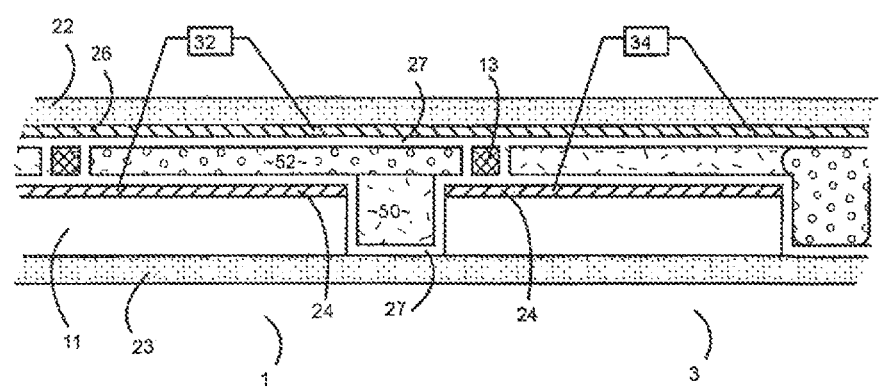
FIG. 1B is a side view of a prior art display element.

Referencing FIGS. 1A and 1B, an electromechanical force on a conductive fluid on an electrical insulator underlies the physical mechanism for a first exemplary embodiment of the present disclosure. This electromechanical force originates near a line of contact between a conductive fluid and a capacitor and is proportional to electrical capacitance multiplied by the square of the voltage applied. The electromechanical force is generally oriented so that the force is directed outward from the exposed surface of the fluid. This arrangement provides high-speed operation (on the order of milliseconds), relatively low power capacitive operation (about 10 mJ/m2), and excellent reversibility. However, alternative exemplary embodiments of the present disclosure may include other fluid manipulation methods well-known by those skilled in the art of microfluidics. These alternate methods include, but are not limited to, electrowetting without insulators, thermocapillary, photo-responsive molecules such as spiropyrans, dielectrophoresis, and micro-electromechanical pumping.

A Cartesian coordinate system will be used to define specific directions and orientations with respect to the exemplary embodiments. References to terms such as "above," "upper," and "below," "lower," are for convenience of description only and represent only one possible frame of reference for describing the exemplary embodiments. It is also to be understood that the exemplary dimensions of components and the overall device described herein cover a wide range of sizes from nanometers to meters based on the application. Terms such as "visible" may be used in some cases to describe a person or machine vision system or other optical source or detector that is facing towards the upper surface of the embodiments described herein.

The term "liquid" or "fluid" is used herein to describe any material or combination of materials that is neither solid nor plasma in its physical state. A gas may also be considered as a fluid so long as the gas moves freely according to the principles of the present disclosure. Solid materials, such as liquid powders, can also be considered a liquid so long as they move freely according to the principles of the present disclosure. Liquids or fluids can also contain any weight percent of a solid material so long as that solid material is stably dispersed in the liquid or fluid. The term liquid is not limited to any particular composition, viscosity, or surface tension.

Optical gain is defined as the ratio of light intensity reflecting off a surface relative to the light intensity reflecting off of a perfectly diffuse or lambertian surface for the same incident light source. The reflection intensity, and hence the optical gain, is a function of viewing or measuring angle relative to the orientation of the surface. Surfaces with optical gain reflect more light towards the light source than at low angles relative to the surface.

The term viewing cone refers to a typical angular range for which a consumer tends to view a portable electronic display. Most consumers view phone, tablet, computer, camera, and other portable displays with a viewing cone less than +/−30 degrees. They will often re-orient the display to minimize glare from light sources. Consumers will also re-orient a portable reflective display (or a book) to take advantage of available light sources, providing an opportunity for optical gain to occur within the viewing cone.

The term 'textured surface' is used herein to describe an engineered surface geometry for the purpose of providing a distribution of surface angles to convert the intrinsic 'silvery' specular reflective properties of typical metals to a more diffuse reflective characteristic.

Referring now to FIGS. 1A and 1B, a side view is shown of two prior art display elements, 1 and 3. Each display element comprises a substrate 23, a topstrate 22, and includes a fluid-filled channel spanned by spacers 13. The spacers in part divide the channel into sub-pixel elements 1 and 3. The inside surfaces of the channel are coated with a hydrophobic dielectric layer 27. In a preferred embodiment, this layer is comprised of a stack containing a fluorinated surface film in contact with the fluids in the channel, which may be 1 nm to 150 nm thick, and a dielectric positioned between the fluorinated surface and electrically conducting films. Suitable dielectrics include but are not limited to parylene C, Parylene HT, polyimide, silicon oxide, silicon nitride, and alumina. Each sub-pixel element has a voltage source 32,34, and electrodes 24,26 on opposing sides of the channel which allow an electric field to be applied across the channel. Polar 52 and non-polar 50 fluid bodies are positioned within the channel. The polar and non-polar fluids 52 and 50, have different optical properties. For example, the polar fluid 52, also called ink, may contain a pigment and appear colored or black to the viewer while the non-polar fluid 30 is transparent or translucent. FIG. 1B depicts the effect of apply voltage through voltage source 32 to sub-pixel element 1, while no voltage is applied to voltage source 34. Applying voltage to sub-pixel element 1 causes the polar fluid 52 to increase its area coverage of the channel surface. (compare FIG. 1A with FIG. 1B). In order for the polar fluid to increase its area coverage of the channel the fluid must move laterally through the channel.

Although the present invention will be described in connection with certain embodiments, the description of the one or more embodiments is not intended to cover all alternatives, modifications, and equivalent arrangements as may be included within the spirit of the present invention. In particular, those of ordinary skill in the art will recognize that the components of the various electrofluidic devices described herein may be arranged in multiple different ways.

Figure 2A:
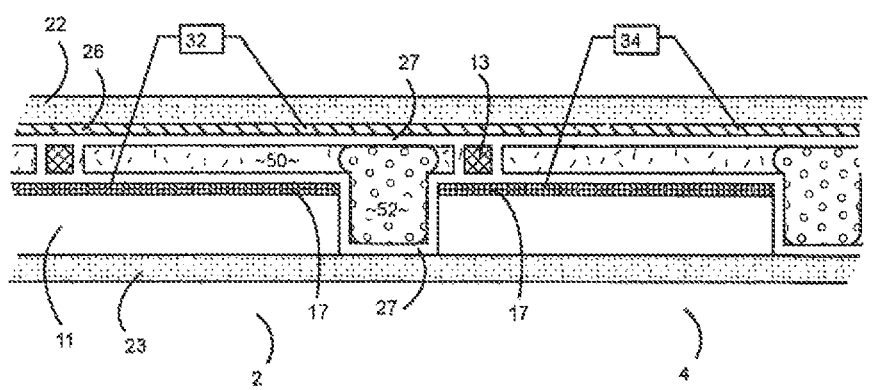
FIG. 2A is a side view of reflective electrofluidic display device according to an embodiment of the invention.
Figure 2B:
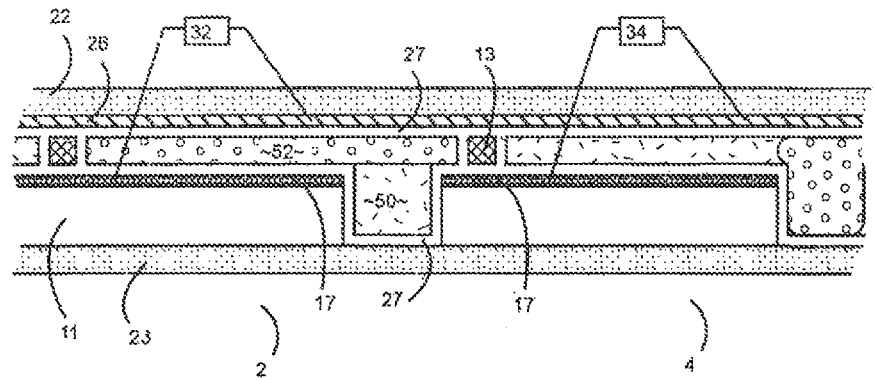
FIG. 2B is a side view of reflective electrofluidic display device according to an embodiment of the invention.

An electrofluidic device 100, as shown in FIGS. 2A and 2B and incorporating certain elements discussed previously, is an improvement over conventional electrofluidic devices because of inclusion of a metal film rear electrode 17 to make the electrode reflective. The reflective electrode 17 is textured with concavities, projections or a combination of both in order to convert the intrinsic specular 'silvery' characteristic of metal films into a non-specular film providing paper-like characteristics and/or optical gain. The concavities and projections define a surface texture with convex and/or concave geometrical features operative to alter an angle of reflected light from a specular reflection to provide the appearance of at least one of a diffuse reflection and a non-metallic reflection.

Referring now to FIGS. 2A and 2B, a textured reflector 17 is incorporated into electrofluidic display elements 2, 4 of an electrofluidic device 100 to provide a diffuse reflectance for light entering the electrofluidic device through topstrate 22. Each display element comprises a substrate 23, a topstrate 22, and includes a fluid-filled channel spanned by spacers 13. The spacers in part divide the channel into sub-pixel elements 2 and 4. The inside surfaces of the channel are coated with a hydrophobic dielectric layer 27. In a preferred embodiment, this layer is comprised of a stack containing a fluorinated surface film in contact with the fluids in the channel, which may be 1 nm to 150 nm thick, and a dielectric positioned between the fluorinated surface and electrically conducting films. Suitable dielectrics include but are not limited to parylene C, Parylene HT, polyimide, silicon oxide, silicon nitride, and alumina. Each sub-pixel element has a voltage source 32,34, and electrodes 24,26 on opposing sides of the channel which allow an electric field to be applied across the channel. Polar 52 and non-polar 50 fluid bodies are positioned within the channel. The polar and non-polar fluids 52 and 50, have different optical properties. For example, the polar fluid 52, also called ink, may contain a pigment and appear colored or black to the viewer while the non-polar fluid 30 is transparent or translucent. FIG. 2B depicts the effect of apply voltage through voltage source 32 to sub-pixel element 1, while no voltage is applied to voltage source 34. Applying voltage to sub-pixel element 1 causes the polar fluid 52 to increase its area coverage of the channel surface (compare FIG. 2A with FIG. 2B). In order for the polar fluid 52 to increase its area coverage of the channel the fluid must move laterally through the channel. The color ink 52 does not become trapped in the troughs or convex geometric features of the textured reflector 17, which is covered by the hydrophobic layer 27, because the color ink does not wet the hydrophobic surface 27 in the absence of applied voltage, and in the presence of the non-polar fluid. The colored or black polar fluid has a contact angle with the hydrophobic layer-coated reflector surface that exceeds 90 degrees, and more preferably 120 degrees. This ensures that the colored fluid does not stick in the texture of the surface creating an optical defect. The presence of the non-polar fluid will often leave a nanometer-scale layer between the hydrophobic layer and the polar fluid, thereby increasing the contact angle of the polar fluid as compared to the polar fluid on the surface in air. It should be appreciated that this 90 degree contact angle is a bulk property measured against the plane of the reflector surface over a millimeter length scale. If it is measured at the microscopic scale of the texture, the angular features of the texture make measuring the local angle difficult.

Figure 2C:
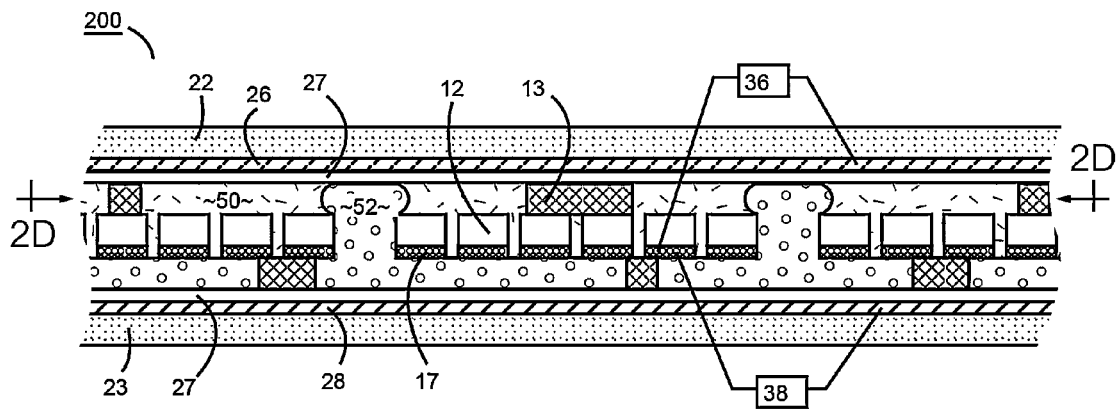
FIG. 2C is a side view of another reflective electrofluidic display device according to an embodiment of the invention.

Referring now to FIG. 2C, a second electrofluidic display device structure 200 is depicted in cross-sectional view, also incorporating textured reflector 17. FIG. 2C shows a device comprising a topstrate 22 and substrate 23, transparent or translucent electrode 26, electrode 28, and a hydrophobic dielectric coated on the electrodes. The textured metallic reflector layer is attached to a middle layer 12, positioned between the topstrate 22 and substrate 23, and the said middle layer defines two channels, one between the middle layer 12 and the topstrate 22, and one between the middle layer 12 and the substrate 23. Polar fluid 52 and non-polar fluid 50 occupy the channels. The display device 200 has two channels in fluidic connection such that the polar fluid 52 can move between the channels. The display element operates by attracting the polar fluid 52 to either electrode 26 or 28 by applying voltage to a channel using either voltage source 36 or 38.

Figure 2D:
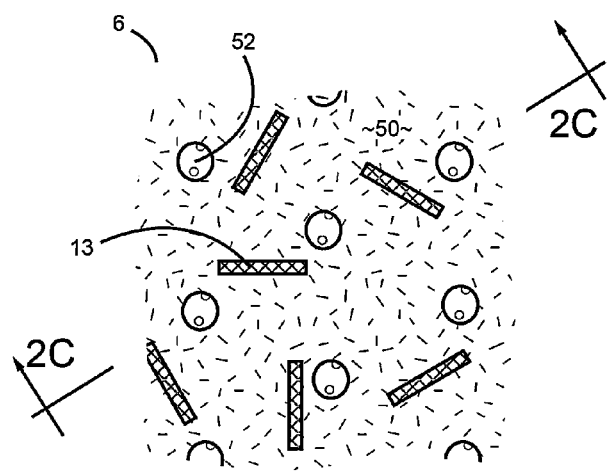
FIG. 2D is a top view of reflective electrofluidic display device according to FIG. 2C.

FIG. 2D. depicts the display device structure 200 of FIG. 2A in a top—down view, through the transparent topstrate. A viewer of this display would see the textured reflector 17 at the back of the channel between the middle layer 12 and the topstrate 22, henceforth referred to as the viewer-side channel, where clear non-polar fluid 50 is present. The viewer would see black in the regions where the polar ink 52 is located.

In an exemplary circumstance, the positions of the fluids 50, 52 are stable in any position, which are held in place by contact angle hysteresis in the channels and a balance of Young-Laplace pressures between the channels.

Electrodes 26,28 are formed on the substrate 23 and topstrate 22 and are covered by the dielectric hydrophobic 27. The electrode 17 on the middle layer is coated with a porous hydrophobic material (not shown) and provides electrical contact to the polar fluid 52. Together, these electrodes 17,26, form a capacitor in the viewer-side first channel and these electrodes 17,28 form a capacitor in the second (back-side) channel. When the polar fluid 52 is not in the viewer-side channel, the capacitance of the viewer side channel forms between the topstrate electrode 26 and the middle electrode 17, through the dielectrics of the non-polar fluid 50, the top electrode dielectric 26, and the hydrophobic layers 27. When the polar fluid 52 completely fills the viewer-side channel, the polar fluid is in electrical contact with the middle electrode 17 and the channel capacitance forms between the polar fluid 52 and the topstrate hydrophobic dielectric layer 27. When the polar fluid 52 is partially in the viewer-side channel, the viewer-side channel capacitance results from the combination of the oil-filled volume and polar fluid-filled volume. Likewise, the backside channel capacitance also varies with the position of the polar fluid 52. Consequently, the capacitance of the each channel varies greatly, potentially by a factor of less than, equal to, or more than ten depending on the distribution of the polar fluid 52 between the two channels. This change in capacitance may be used to improve the electrical driving of the display elements.

Figure 2E:
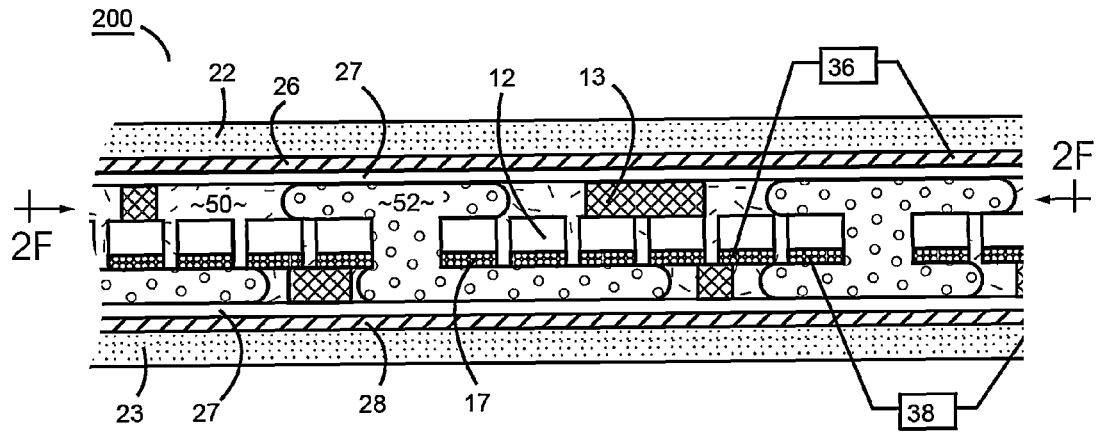
FIG. 2E is a side view of another reflective electrofluidic display device according to an embodiment of the invention.
Figure 2F:
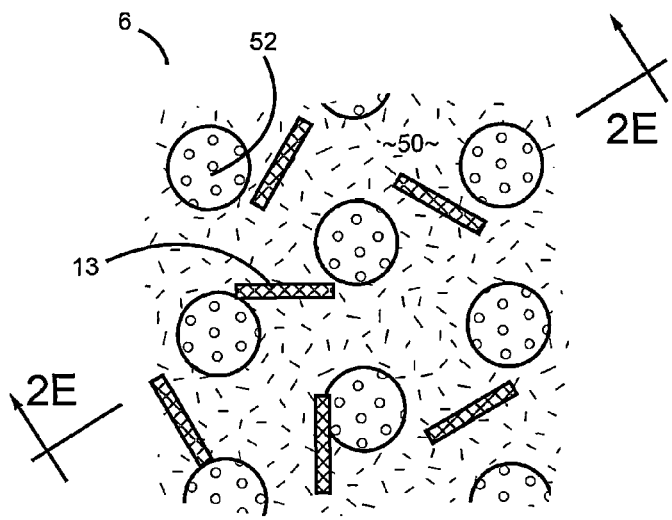
FIG. 2F is a top view of reflective electrofluidic display device according to FIG. 2E.

Referring now to FIGS. 2E and 2F, when a voltage is applied by voltage source 36 to the view-side channel capacitor, the polar fluid is moved and this movement changes the coverage area of the polar fluid in the viewer channel in a very controlled manner (compare FIGS. 2C and 2E). FIG. 2F depicts a top-down view of the viewer side channel illustrated in cross-section in FIG. 2E following the application of voltage to the viewer-side channel. The area coverage of colored polar fluid 52 increases (compare FIGS. 2D and 2F). In order to cover the additional area of the textured metallic surface 17, the colorant moves laterally across the surface.

The properties of the surface texture of the underlying textured reflector 17 drive the optical performance of the displays 100 and 200. Important variables include the type of reflective material utilized, the angle and shape profile of the textured surface (e.g., geometric features), the height of the textured features, and the periodicity or lack of textured features. In terms of materials, metallic materials may be utilized and, among these materials, silver has superb optical reflectivity over the visible light spectrum. Nevertheless, other metallic materials may be used such as, without limitation, pure metals, impure metals, and alloyed metals. By way of example, aluminum may be utilized as the textured reflector 17 because of its preferred reflective properties and its self-passivating properties, not to mention a cost that is less than precious metals such as silver. An important point in the design of the textured surface is that the channels in the display devices 100 and 200 have exemplary heights in the range of 4 micrometers to 30 micrometers. Consequently, the height of the textured surface must be significantly smaller than these heights. The height of the texture must be small enough that it does not interfere with the lateral flow of fluids. However, the height must be larger than approximately ¼ the wavelength of light that is reflected. Another constraint is that each pixel element in a display device should have a complete distribution of reflection angles for a diffuse appearance. Display pixels for eReaders and Tablets are as small as 150 micrometers, 85 micrometers, or even smaller, so a large number of these reflectors are required in this small area. The geometrical features need to be spaced less than about 10 micrometers to provide enough of them within a pixel area. These factors dictate that the textured feature height should be in the range of 200 nm to a few micrometers. The texture height over the spatial/lateral spacing defines an aspect ratio, which in turn defines the angle of the reflective surfaces.

Figure 3A:
FIG. 3A is a diagrammatic view in partial cross-section of a textured surface for the purpose of modeling the surface reflectivity.
Figure 3B:
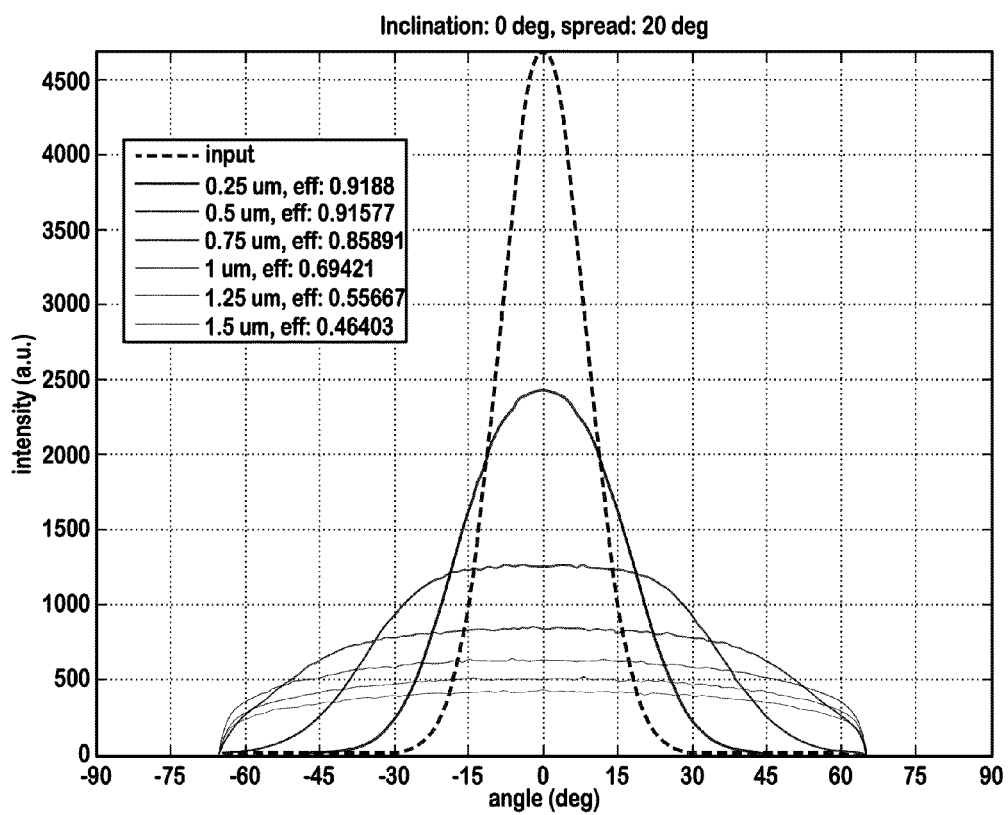
FIG. 3B is a modeling result illustrated the effect of texture on optical gain.

The relative effects of texture as part of a textured reflector 17 may be compared with an optical model. As shown in FIG. 3, the reflective properties of several textured reflectors (e.g., an undulating reflective metallic surface) may be computed as part of calculations carried out on a hypothetical electrofluidic device comprising the relevant layers including the textured reflective metal, a dielectric layer, a hydrophobic layer, a non-polar fluid, a $2^{nd}$ hydrophobic layer, a second dielectric layer, a transparent or translucent conductive layer, and a topstrate. An anti-reflective coating was used on the exterior surface of the topstrate for some computations. FIG. 3A shows a cross-sectional profile of an exemplary surface texture with an approximately sinusoidal profile, having a period 6.7 times the peak-to-peak amplitude, defining an aspect ratio of 1/6.7, which is approximately 0.15. FIG. 3B shows the results of a computation using an 'absolute value of sinusoidal' profile for the texture, where the height of the geometric features of the textured surface of the textured reflector 17 was varied from 0.25 micrometers to 1.5 micrometers, and the period was fixed at 10 micrometers. The 0.25 micrometer texture was mostly specular, but increasing the height of the geometric features improved the angular distribution of reflected light and reduced its amplitude in the predominantly normal direction. Above 0.75 micrometers, the angular distribution is relatively flat across the +/−45 degree viewing cone, and even a +/−60 degree viewing cone. For portable electronic devices targeted towards single viewers, it is not uncommon for single viewers to automatically adjust the angle of portable displays to maximize viewability, but this data suggests that these viewers need not view portable displays incorporating the exemplary electrofluidic cells with a textured reflector 17 at low angles. Antireflective films, especially on the front glass surface, improve optical performance of the textured reflector at low angles to realize good angular distribution of reflected light.

Figure 4A:
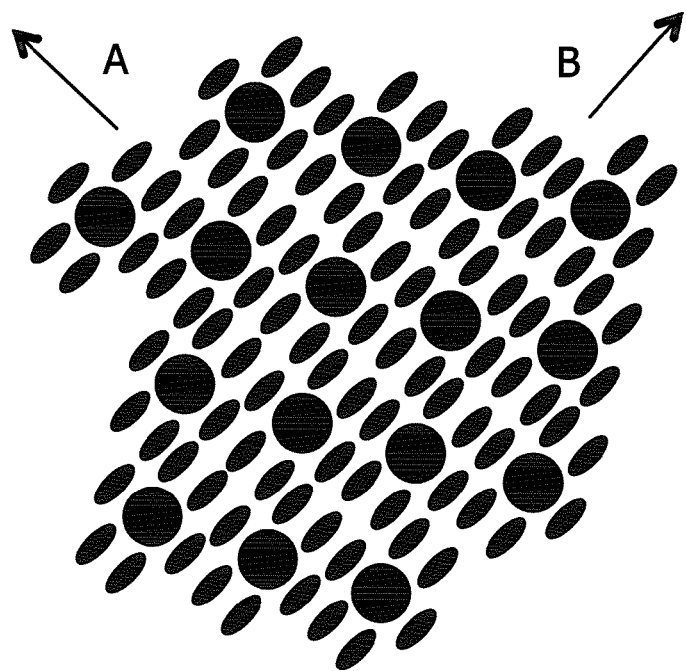
FIG. 4A is a spatially distributed texture design from a top down view with an asymmetric reflective property.
Figure 4B:
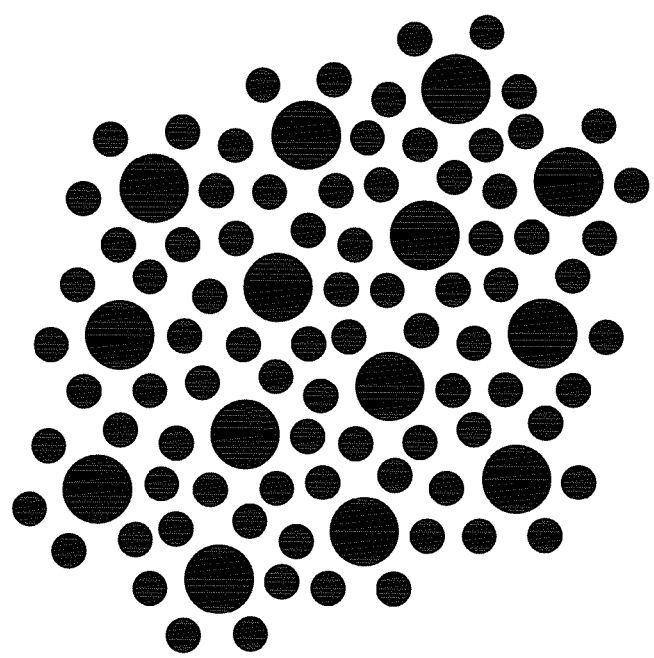
FIG. 4B is a spatially distributed texture design from a top down view with a partially diffuse reflective property.
Figure 4C:
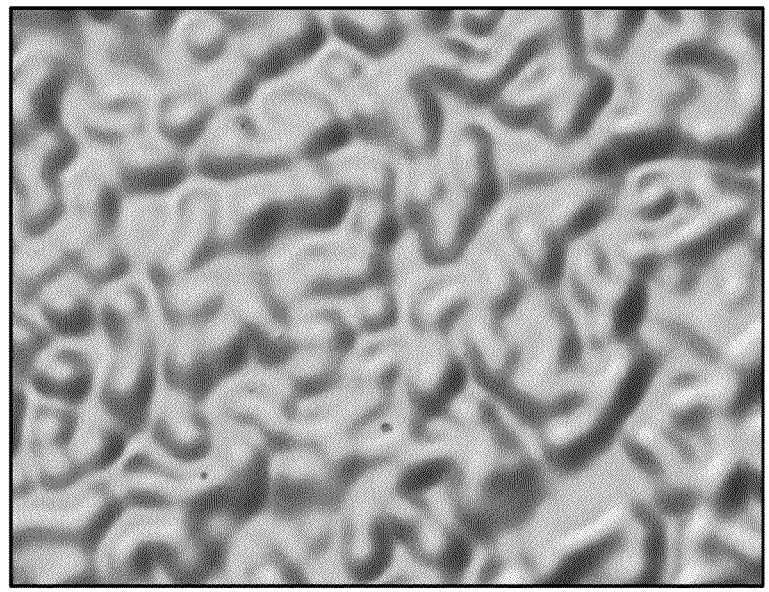
FIG. 4C is a microscopic image of an exemplary textured metallic surface with a randomized diffuse reflective property and a white overall appearance.

A periodically textured surface, such as the textured reflector 17, can create optical defects in a reflective display such as Moire patterns and specular speckle. Consequently, pseudo-periodic and non-periodic structures, exemplary designs of which are shown in FIG. 4, may provide a better solution. Textured surfaces having features of different sizes are operative to reduce the specular component. An example of an asymmetric design is shown in FIG. 4A where the dark regions denote areas higher than average on the surface and light regions denote areas lower than average. The asymmetry preferentially reflects more light in direction A and direction B. An example of a design using multiple feature sizes and semi-random orientation to reduce periodicity is shown in FIG. 4B, where the dark regions denote areas higher than average on the surface and light regions denote areas lower than average. In one embodiment, the maximum height of each size of feature is the same, and therefore, the smaller features would have steeper sidewalls and a different angular distribution of reflector. In another embodiment, the smaller features have a different height than the large features, some randomization of reflection. A scanning electron micrograph of an exemplary randomized textured metal film is show in FIG. 4C. The texture pattern is randomized over a period that is much larger than a display pixel, and stitches together seamlessly at the edges. Such a randomized texture can be incorporated into a polymeric display surface 11 through embossing, microreplication, and related techniques. The surface is then metallized through a vapor deposition technique such as evaporation or sputtering to form textured reflector layer 17. The basic non-periodic texture shown in FIG. 4C can be adjusted by increasing the height (amplitude) of the features.

Figure 5:
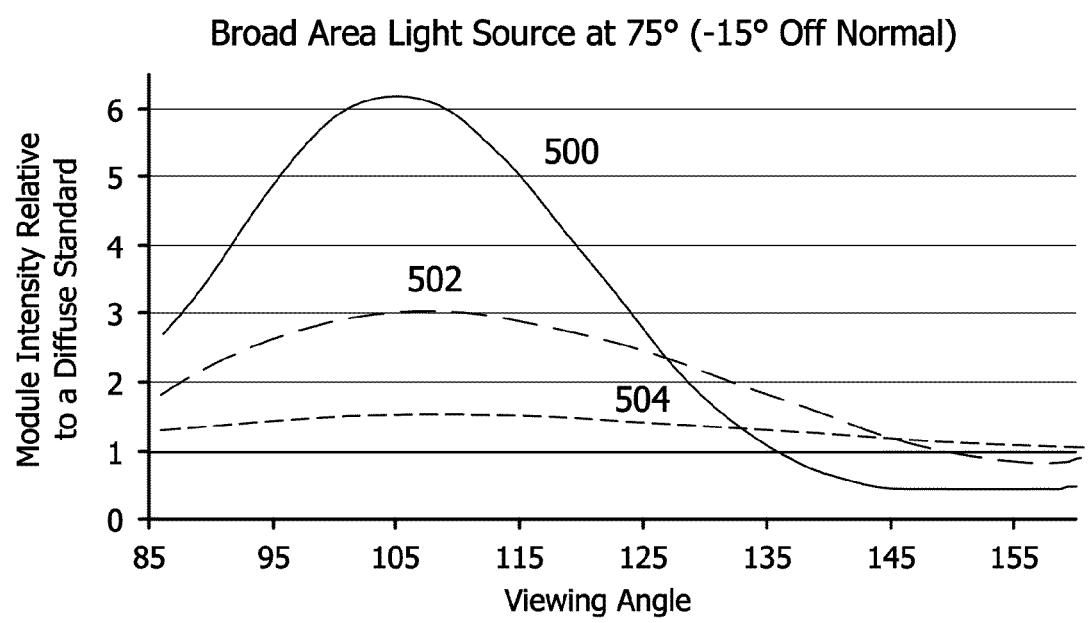
FIG. 5 is a plot of the optical gain of an exemplary textured surface versus viewing angle for different texture amplitudes.

Referring now to FIG. 5, reflection intensity measurements of three surface amplitudes were plotted as a function of viewing angle for a light source at 75 degrees (−15 degrees off normal). The light source used was a 4"×6" LED array positioned approximately 18 inches from the viewable surface. This provided an area light source from one direction, as is typical in a viewing situation. The first curve 500 represents a surface texture amplitude of 0.75 micrometers and a peak optical gain over a diffuse surface above 600% over a narrow viewing cone, but the curve retains significant angular distribution and specular character. In other words, the surface looks 'silvery'. However, the surfaces texture amplitudes corresponding to curve 502 is 1 micrometer and is 1.5 micrometers for curve 504. The surface textures that produce curves 502 and 504 and look visually white, and concurrently support measured optical gains of 300% and 150% respectively. In short, the cross-over between a specular and silver appearance and a white appearance occurs while there is still enough non-lambertian character to provide significant optical gain.

As can be seen in FIG. 5, the general behavior of reflection from a diffuse surface is a peak of light distributed around the angle of specular reflection. Accordingly, a light source at −15 degrees off normal produces a peak reflection at +15 degrees off normal. Some display devices, such as Motorola pagers employed a holographic film to shift the angle of light reflected from the viewer 15 degrees off the specular reflection direction. This separated the displayed light from the specular reflection off the front surface of the glass, enhancing contrast. Regardless of the optical manipulation of the incoming beam, the profile of a peak in light intensity from a local or point source at the preferred viewing orientation is preserved. One can measure the performance of the display or reflector by setting up a point light source, for example 18 inches away from the display and 15 degrees of normal, and measuring the optical gain versus a lambertian reflector at an angular distribution around the peak of light intensity. What is important is the average light intensity over the viewing cone, as a spike in light, and hence optical gain, over a very narrow angle such as 001 degrees exceeding an optical gain of 5 would not be detectable by the eye, especially after passing through layers of display materials.

Figure 6:
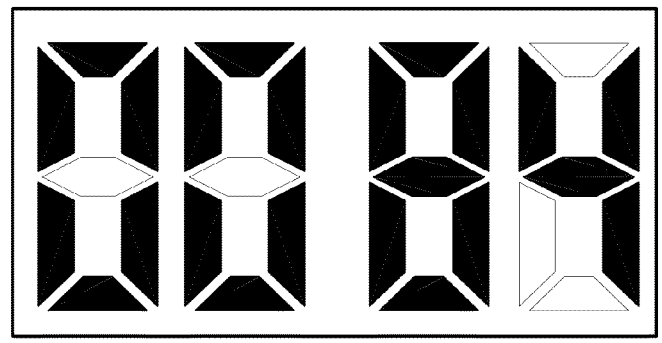
FIG. 6 is an image of an operating black and white display module built with the gain reflector.

Referring to FIG. 6, an example picture of an operating monochrome electrofluidic clock module with 167 dpi resolution at 1.5 cm high×44 cm wide is shown. The display is a physical embodiment of display device 100, depicted in cross-section in FIG. 2. This display demonstrates that the polar ink 52 can move over the textured surface 17 without sticking or otherwise becoming entrained by the concave features of the textured surface, thereby preserving a pixel switching speed exceeding 30 milliseconds (as measured). Each segment of the display is comprised of approximately 100 pixel elements. In this example, a pigmented colorant was incorporated into the polar fluid 52, while the non-polar fluid 50 was clear.

The optical gain provided by a diffuse surface can be leveraged in a display to provide additional light in a typical use case viewing cone. The quantity of light with a 2× to 3× optical gain is sufficient to overcome optical losses inherent in laterally-arranged color sub-pixel structures (RGB or RGBW). For example, a 300% gain can offset the ⅓ optical efficiency of the RGB color scheme, in comparison to the layered CMY color format of printed media, provided by print-level colors in reflective electronic displays which lower cost lateral color filter schemes.

A reflective display that looks as good as paper would meet the specifications for printed media. Examples of these are the standards for newspaper (SNAP—Specifications for Newspaper Advertising Production) and magazine (SWOP—Specifications for Web Offset Publications) standards. The standards are quoted in L-A-B color space, where L* is the lightness value, which is non-linearly proportional to the reflectivity with an algorithm the represents the brightness perception of the human visual system. The 'a' and 'b' terms represent color saturation in the red-green and blue-yellow channels. The SNAP standard in Table 1 below includes a % R computation for each L* value. The level of reflectivity needed to reach newspaper is 60% for white and 12% to 25% for most colors, except yellow, which is 53%. The SWOP standard, again with reflectivity computed in Table 2, requires even higher reflectivity for each color.

TABLE 1

SNAP Standard and Reflectivity

|  | White (paper) | Black (Kink) | Cyan | Magenta | Yellow | Red (MY stack) | Green (CY stack) | Blue (CM stack) |
|---|---|---|---|---|---|---|---|---|
| L* | 82 | 36 | 57 | 54 | 78 | 52 | 53 | 41 |
| % R | 60 | 9 | 25 | 22 | 53 | 20 | 21 | 12 |
| a* | 0 | 1 | −23 | 44 | −3 | 41 | −34 | 7 |
| b* | 3 | 4 | −27 | −2 | 58 | 25 | 17 | −22 |

TABLE 2

SWOP Standard and Reflectivity

|  | White (paper) | Black (Kink) | Cyan | Magenta | Yellow | Red (MY stack) | Green (CY stack) | Blue (CM stack) |
|---|---|---|---|---|---|---|---|---|
| L* | 90 | 19 | 57 | 48 | 85 | 47 | 52 | 27 |
| % R | 77 | 3 | 25 | 17 | 66 | 16 | 20 | 5 |
| a* | 0 | 1 | −38 | 70 | −6 | 64 | −61 | 19 |
| b* | 4 | 1 | −41 | −4 | 85 | 43 | 27 | −42 |

Reflective display technology has a major disadvantage in that it is cost prohibitive and complicated to stack colors like printed media (in a CMY configuration). Displays generally use lateral color approaches, where each pixel is comprised of multiple sub-pixels on the display plane, where each sub-pixel is assigned a color. Common configurations include RGB and, for reflective displays, RGBW, to enhance the white state. As can be seen in Table 3, electrophoretic technology, which has an intrinsically lambertian reflection characteristic, falls short of newspaper is white reflectance, and when a lateral color filter scheme is added, the reflectivity falls a factor of 3 to 4 below paper color. Also included in table 3 are computations for electrowetting and electrofluidic technologies with a lambertian diffuse reflector positioned behind them. These have higher intrinsic efficiencies, but the color capability still falls below newspaper.

TABLE 3

Color Filter efficiency.

| Display Technology | Intrinsic Display Lambertian White Reflectance (%) | Theoretical single color reflectance for RGBW (%)* |
|---|---|---|
| Electrophoretic (eInk) | 38% | 7.6% |
| Electrowetting | 60% | 12% |
| Electrofluidic | 70% | 14% |

*assumes 80% color filter efficiency.

Both LCD and electrophoretic technologies have been marketed and sold with color filter arrays. To improve the overall reflection efficiency, the displays have employed color filters that are not optically dense enough, allowing 'white' light to blend with the color. These reduce the color saturation (a* and/or b*) and makes the colors look pastel, but it increases the L* values. This technique clearly compromises the color saturation performance.

Optical gain provides a solution for this reflective color challenge, particularly for portable electronic devices because, for portable devices, the viewing cone is targeted to a single viewer situated directly in front of the display. The viewing cone is narrow (+/−50 degrees) or even +/−30 degrees. This allows a reflector with optical gain to provide more reflection in the direction of the viewer than at oblique angles, thereby enhancing the color performance. In Table 4, the theoretical white and color reflectance percentages and L* values have been calculated for various display technologies. With gain, electrofluidic technology can exceed both the white and color performance of printed media in all areas except for yellow. However, other solutions exist for reaching yellow, as examples of which is changing the relative sizes to the pixels or adding white to the yellow. In short, optical gain, in combination with a highly optically efficient display technology, which involves lateral movement of the colorant, can produce printed media colors with lateral color schemes.

TABLE 4

Computed Color Performance with optical gain over +/−30 degree viewing cone.

| Display Technology | Intrinsic Display Reflectance % | Optical Gain | RGBW White Reflectance with Gain | RGBW single color reflectance with gain | White L* with gain | RGBW single color L* with gain |
|---|---|---|---|---|---|---|
| Electrophoretic | 38% | 1 | 15% | 7.6% | 46 | 33 |
| electrowetting | 60% | 3* | 72% | 36% | 88 | 67 |
| electrofluidic | 70% | 3 | 84% | 42% | 93 | 71 |

Figure 7:
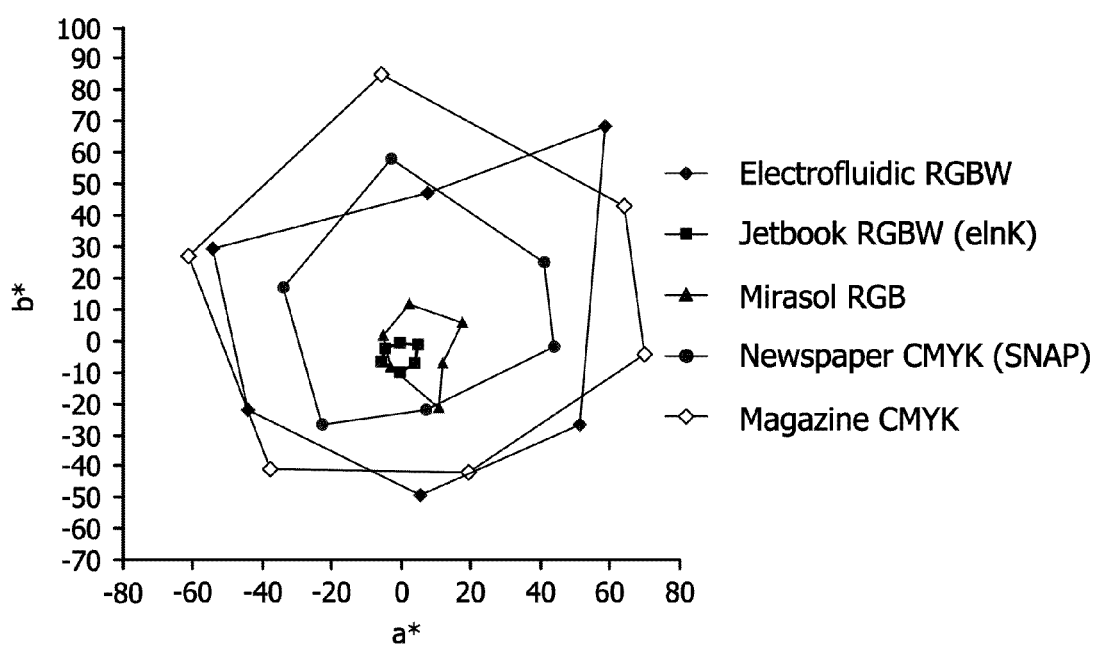
FIG. 7 is the color performance of display device modules with RGBW color filters over the gain reflector.

Referring now to FIG. 7, optical color measurements of a diffuse metallic reflector surface with RGBW color filters over the top are compared to other reflective electronic displays, and to the standards for newspaper (SNAP—Specifications for Newspaper Advertising Production) and magazine (SWOP—Specifications for Web Offset Publications) standards. The measurement was performed with the detector positioned normal to the surface and broad-area light source illumination centered at 15 degree off normal. The measurements of the diffuse reflector and color filters are substantially larger than competing electrophoretic and MEMs reflective display technologies. Moreover, the measurements exceed the newspaper standard, and are similar to the magazine standard. Electrofluidic modules with the right gain can achieve printed media colors.

Additional display device embodiments of this invention (not pictured) have in common the textured reflector component and lateral movement of the colorant across the surface. The colorant occupies a stored state, with minimum colorant in the optical path. Actuation, either through removal or application of voltage, causes the colorant to move laterally across the surface to a state covering the textured reflector. Lateral electrophoretic technology is an example of an electro-optic technology that could be combined with the textured reflector technology to achieve displays with optical performance exceeding the SNAP standard.

What is claimed is:

1. A display device comprising:
   a pixel, where the pixel includes:
      a polar fluid that is at least one of colored and black,
      a non-polar fluid that is at least one of transparent and translucent,
      a first substrate,
      a second substrate arranged relative to the first substrate to define a channel occupied by the polar fluid and the non-polar fluid, wherein at least one of the polar fluid and the non-polar fluid is visible through at least one of the first substrate and the second substrate,
      a reflector having a plurality of features, comprising at least one of concavities and projections, that alter an angle of reflected light from a specular reflection to provide the appearance of a diffuse reflection, and
      wherein the reflector includes a hydrophobic coating causing the polar fluid that is at least one of colored and black to be non-wetting to the hydrophobic coating in the presence of the non-polar fluid,
      a plurality of electrodes configured to cause repositioning of the polar fluid in the channel to displace at least a first portion of the non-polar fluid; and,
   a voltage source;
   wherein repositioning of the polar fluid occurs as a unified volume to retard reduced light reflection from the reflector in a portion of the channel where the polar fluid has been repositioned;
   wherein the reflector provides an average observable gain in reflection that is at least one times greater but no more than five times greater than a Lambertian reflector over a +/−20 degree viewing cone around a peak in reflected intensity from an external point light source oriented 15 degrees off normal to a display surface.

2. The display device of claim 1, wherein the reflector comprises at least one of a polymer film and a metal film.

3. The display device of claim 1, wherein the plurality of features have a peak-to-valley distance greater than 0.75 μm but no more than 2 μm.

4. The display device of claim 1, wherein:
   the pixel includes a plurality of pixels; and,
   the voltage source is in electrical communication with the plurality of pixels.

5. The display device of claim 4, wherein an observed white reflectance exceeds the standard specified in the specifications for newsprint advertising.

6. The display device of claim 4, wherein each of the plurality of pixels includes a color filter plate.

7. The display device of claim 6, wherein the color filter plate is at least one of red, green, and blue.

8. The display device of claim 1, further comprising an incident light source, wherein the incident light source includes at least one of an edge light source, an integrated optical waveguide, and an integrated array of front lights.

9. A display device comprising:
a pixel comprising:
a viewer-side transparent top plate,
a back-side supporting substrate,
a channel interposing the substrate and the top plate, the channel including a viewable portion that is viewable through the top plate,
a reflector viewable through the viewable portion of the channel,
a fluid at least one of colored and black in the channel and repositionable between a stored state where the fluid covers less than forty percent of the reflector within the viewable portion of the channel and a deployed state where the fluid covers more than fifty percent of the reflector within the viewable portion of the channel; and,
electrodes configured to apply a voltage across the channel when in electrical communication with a voltage source, the voltage applied across the channel operative to change how much of the reflector is covered by the fluid within the viewable portion of the channel;
wherein the reflector includes a predominantly diffuse reflection and an average optical gain greater than 1 and less than 5.0 over a +/−20 degree viewing cone around a peak in reflected intensity from an external point light source oriented 15 degrees off normal to a display surface.

10. The display device of claim 9, wherein:
the channel includes a storage area outside of the viewable portion; and,
the colored fluid occupies the storage area when the colored fluid is in the stored state.

11. The display device of claim 9, wherein the reflector interposes at least a portion of the channel and the top plate.

12. The display device of claim 9, wherein the reflector interposes at least a portion of the channel and the substrate.

13. The display device of claim 9, wherein the reflector includes a plurality of at least one of concavities and projections that alter an angle of reflected light from a specular reflection to provide the appearance of a diffuse reflection.

14. The display device of claim 9, wherein an optical gain is above 1.0 and below 1.75 over a +/−50 degree viewing cone in the presence of a normally incident light source.

15. The display device of claim 9, wherein the reflector includes a topography having a plurality of projections with an average amplitude less than 0.75 micrometers and greater than 2.0 micrometers.

16. The display device of claim 9, wherein the reflector includes a topography having a plurality of projections with an average aspect ratio greater than 0.05 and less than 2.

17. The display device of claim 9, wherein the reflector includes a topography comprised of undulations including a sinusoidal profile.

18. The display device of claim 9, wherein the reflector includes a topography comprised of undulations having random orientations.

19. The display device of claim 9, wherein the reflector comprises a metal film coating formed of at least one of an embossed polymer and a micro-replicated polymer coated with a metal film.

20. A display device comprising:
a pixel, where the pixel includes:
a polar fluid that is at least one of colored and black,
a non-polar fluid that is at least one of transparent and translucent,
a first substrate,
a second substrate arranged relative to the first substrate to define a channel occupied by the polar fluid and the non-polar fluid, wherein at least one of the polar fluid and the non-polar fluid is visible through at least one of the first substrate and the second substrate,
a reflector having a plurality of features, comprising at least one of concavities and projections, that alter an angle of reflected light from a specular reflection to provide the appearance of a diffuse reflection, a plurality of electrodes configured to cause repositioning of the polar fluid in the channel to displace at least a first portion of the non-polar fluid, where at least one of the plurality of electrodes includes the reflector,
a dielectric layer interposing the channel and at least one of the reflector and at least one of the plurality of electrodes that includes the reflector; and,
a voltage source;
wherein the reflector provides an average observable gain in reflection that is at least one times greater but no more than five times greater than a Lambertian reflector over a +/−20 degree viewing cone around a peak in reflected intensity from an external point light source oriented 15 degrees off normal to a display surface.

* * * * *